(12) United States Patent
Trowbridge et al.

(10) Patent No.: US 10,690,208 B2
(45) Date of Patent: Jun. 23, 2020

(54) COMPOSITE BEAD PLATE AND AN AIR SPRING USING THE SAME

(71) Applicant: Stemco Products, Inc., Charlotte, NC (US)

(72) Inventors: Mark G. Trowbridge, Stow, OH (US); David A. Palky, North Canton, OH (US); David J. Maguire, Hudson, OH (US)

(73) Assignee: Stemco Products, Inc., Charlotte, NC (US)

( * ) Notice: Subject to any disclaimer, the term of this patent is extended or adjusted under 35 U.S.C. 154(b) by 0 days.

(21) Appl. No.: 15/183,586

(22) Filed: Jun. 15, 2016

(65) Prior Publication Data

US 2017/0023085 A1    Jan. 26, 2017

Related U.S. Application Data

(63) Continuation of application No. 14/200,150, filed on Mar. 7, 2014, now Pat. No. 9,388,876.

(60) Provisional application No. 61/774,707, filed on Mar. 8, 2013.

(51) Int. Cl.
| | | |
|---|---|---|
| *F16F 9/04* | (2006.01) | |
| *B60G 11/27* | (2006.01) | |
| *F16F 9/05* | (2006.01) | |

(52) U.S. Cl.
CPC ............ *F16F 9/0454* (2013.01); *B60G 11/27* (2013.01); *F16F 9/0463* (2013.01); *F16F 9/05* (2013.01); *B60G 2202/152* (2013.01); *B60G 2206/70* (2013.01); *F16F 2224/0241* (2013.01); *F16F 2230/0023* (2013.01)

(58) Field of Classification Search
CPC .......... F16F 9/0454; F16F 9/0463; F16F 9/05; F16F 2226/04; F16F 2226/041; F16F 2226/044; F16F 2226/045; F16F 2226/047; B60G 2206/424; B60G 2204/126

See application file for complete search history.

(56) References Cited

U.S. PATENT DOCUMENTS

| | | | | |
|---|---|---|---|---|
| 894,117 | A * | 7/1908 | Clark ........................ | F16F 9/05 267/64.24 |
| 2,920,885 | A * | 1/1960 | Walter ...................... | B61F 5/10 105/198.1 |
| 2,922,637 | A * | 1/1960 | Bowser ................. | F16F 9/0454 152/396 |

(Continued)

FOREIGN PATENT DOCUMENTS

| | | |
|---|---|---|
| EP | 1321694 | 6/2003 |
| FR | 1173675 | 2/1959 |

(Continued)

*Primary Examiner* — Bradley T King
*Assistant Examiner* — Stephen M Bowes
(74) *Attorney, Agent, or Firm* — Perkins Coie LLP

(57) ABSTRACT

The present invention discloses an air spring comprising a piston, a top plate, a clamp ring, a snap ring, and a flexible member which is affixed to the piston and the top plate, wherein the piston, the top plate and the flexible member define a pressurizable chamber, wherein the snap ring is affixed to the clamp ring, wherein the clamp ring affixes an upper portion of the flexible member to the top plate, wherein the clamp ring affixes the snap ring to the top plate, and wherein the top plate is affixed between the snap ring and the flexible member.

15 Claims, 11 Drawing Sheets

(56) References Cited

U.S. PATENT DOCUMENTS

| | | | |
|---|---|---|---|
| 3,044,761 A * | 7/1962 | Davies | F16F 9/0454 |
| | | | 267/64.24 |
| 4,784,376 A | 11/1988 | Ecktman | |
| 4,787,606 A * | 11/1988 | Geno | F16F 9/0463 |
| | | | 267/64.24 |
| 4,793,598 A | 12/1988 | Geno et al. | |
| 4,946,144 A | 8/1990 | Geno et al. | |
| 6,513,798 B2 | 2/2003 | Capek | |
| 6,926,264 B1 | 8/2005 | Trowbridge | |
| 7,681,868 B2 | 3/2010 | Scholz | |
| 9,388,876 B2 * | 7/2016 | Trowbridge | B60G 11/27 |
| 2008/0111288 A1 * | 5/2008 | Howard | F16F 9/0409 |
| | | | 267/64.27 |
| 2008/0246198 A1 | 5/2008 | Levy et al. | |

FOREIGN PATENT DOCUMENTS

| | | | | |
|---|---|---|---|---|
| FR | 1425224 A * | 1/1966 | | F16F 9/0454 |
| FR | 2117118 A5 * | 7/1972 | | F16F 9/0454 |
| GB | 873348 A * | 7/1961 | | F16F 9/0454 |
| GB | 1001515 A * | 8/1965 | | F16F 9/0454 |
| GB | 1071931 | 6/1967 | | |
| WO | WO 2012077364 | 6/2012 | | |

* cited by examiner

COMPOSITE BEAD PLATE AND AN AIR SPRING USING THE SAME

This application is a continuation of U.S. patent application Ser. No. 14/200,150, filed Mar. 7, 2014, now U.S. Pat. No. 9,388,876, which claims the benefit of U.S. Provisional Patent Application Ser. No. 61/774,707, filed on Mar. 8, 2013, the entirety of each of which is hereby incorporated by reference.

FIELD OF THE INVENTION

The present invention is in the field of air springs. More specifically this invention relates to air springs for use in corrosive environments.

BACKGROUND OF THE INVENTION

Air springs have been used as a component of a wide variety of motor vehicles and various other machines and equipment for many years. They are utilized to provide cushioning between movable parts and are primarily employed to absorb shock loads imparted thereon. A typical air spring consists of at least one flexible elastomeric reinforced sleeve extending between a pair of retainers, forming a pressurized chamber therein. The sleeve typically has a relatively inextensible bead core at each end for securing the sleeve to the retainers. Alternatively, the sleeve may be secured to the retainers by conventional crimping means. There may be one or more pistons associated with the air spring. The fluid in the pressurized chamber, generally air, absorbs most of the shock impressed upon or experienced by one of retainers. The retainers move towards and away from each other when the air spring is subjected to forces.

Both upper and lower retainers are conventionally formed of stamped metal. If the air spring has a piston, the piston, upon which the lower retainer is secured, may be metal or thermoplastic. A bumper, mounted on either retainer and provided for impact absorption and transference, is usually thermoplastic or thermoelastic, depending upon the forces which will ultimately be acting on the air spring and the forces to which the bumper will be subjected.

State of the art air springs utilize a steel bead plate which is rolled inwardly to securely affix a flexible member and ensure that there is an air tight seal between the steel bead plate and the flexible member. Because air springs are often used in corrosive environments, the steel bead plate is commonly coated with zinc, paint or some other coating to provide some degree of resistance to corrosion. During the rolling process to join the steel bead plate to the flexible member, the coating is often compromised or destroyed which leads to reduced effectiveness of the coating.

U.S. Pat. No. 4,784,376 discloses an improved air spring including: a pair of end members adapted to be mounted at spaced locations; a flexible sleeve formed of an elastomeric material containing reinforcing cords and having open ends sealingly engaged with the end members forming a pressurized fluid chamber therebetween; one of said end members having an end cap extending within one of the open ends of the sleeve and a clamp ring extending about said one sleeve end in clamped engagement with said end cap compressing the sleeve material therebetween; and an annular curved axially extending projection formed on a mating surface of the clamp ring extending into a concave recess formed in a mating surface of the end cap placing the sleeve in compression shear throughout radially spaced annular areas on opposite sides of said projection, and an intervening area within said recess between said annular compressive shear areas having a greater separation than the thickness of the sleeve material to permit the sleeve material to expand therein.

U.S. Pat. No. 6,926,264 discloses an air spring for absorbing and transmitting shock loads between parts moveable relative to one another, the air spring comprising a flexible cylindrical sleeve which is secured at each end to form a fluid chamber therein, a piston, the sleeve being secured at one end to a retainer and being secured at the opposing end by the piston, the air spring being characterized by: the retainer being integrally formed with an intermediate ribbed reinforcement structure to strengthen the retainer, allowing for direct mounting of the air spring to one of the moveable parts, the intermediate ribbed reinforcement structure of the retainer comprising an outer plate and an inner plate which are parallel to each other, and a plurality of ribs that extend between the outer plate and the inner plate.

U.S. Pat. No. 7,681,868 discloses an air spring comprising: a roll-off piston; a rolling-lobe flexible member made of rubber or elastomeric material; said rolling-lobe flexible member having a first opening lying opposite said roll-off piston and a second opening assigned to said roll-off piston; an attachment part configured as a head plate; said attachment part being made of thermoplastic or thermoset plastic and having air connection means formed integrally therewith; said attachment part having an outer rim and a conical region also formed integrally therewith; said outer rim and conical region facing toward said rolling-lobe flexible member; said attachment part defining a vulcanization region extending from the side of said rim facing toward said rolling-lobe flexible member into said conical region; and, said rolling-lobe flexible member being tightly vulcanized to said attachment part in said vulcanization region at said first opening while said rolling-lobe flexible member is seated in said vulcanization region.

SUMMARY OF THE INVENTION

The present invention discloses an air spring comprising a piston, a top plate, a clamp ring, a snap ring, and a flexible member which is affixed to the piston and the top plate, wherein the piston, the top plate and the flexible member define a pressurizable chamber, wherein the snap ring is affixed to the clamp ring, wherein the clamp ring affixes an upper portion of the flexible member to the top plate, wherein the clamp ring affixes the snap ring to the top plate, and wherein the top plate is affixed between the snap ring and the flexible member.

The present invention more specifically discloses an air spring comprising a piston, a top plate, a clamp ring, and a flexible member which is affixed to the piston and the top plate, wherein the piston, the top plate and the flexible member define a pressurizable chamber, wherein the clamp ring is affixed to an upper portion of the flexible member and holds the flexible member in air-tight contact with the top plate, wherein a portion of the clamp ring is deformed over the top of the top plate to hold the flexible member in permanent air-tight contact with the top member, and wherein the top plate is affixed between the upper portion of the flexible member and the deformed portion of the clamp ring.

The present invention still further discloses an air spring comprising a piston, a top plate, a clamp ring, and a flexible member, wherein the flexible member is affixed to the piston and the top plate to define a pressurizable chamber, wherein the clamp ring is affixed to an upper portion of the flexible member and to the top plate to hold the flexible member in air-tight contact with the top member, wherein clamp ring comprises a plurality of flexible fingers, and wherein the top plate is affixed between the upper portion of the flexible member and the plurality of flexible fingers.

The present invention further discloses an air spring comprising a piston, a top plate, a clamp ring, a retaining ring, and a flexible member, wherein the flexible member is affixed to the piston and the top plate, wherein the piston, the top plate, and the flexible member define a pressurizable chamber, wherein the clamp ring is affixed to an upper portion of the flexible member, wherein the clamp ring comprises a plurality of clamp ring fingers, wherein the top plate comprises a plurality of top plate fingers, wherein the clamp ring fingers interleave with the top plate fingers, wherein the clamp ring fingers and top plate fingers jointly form a channel which is adapted to accommodate the retaining ring, and wherein relative position between the clamp ring and the top plate is substantially fixed by the retaining ring.

The present invention still further discloses an air spring comprising a piston, a top plate, a clamp ring, a retaining ring, and a flexible member which is affixed to the piston and the top plate, wherein the piston, the top plate, and the flexible member define a pressurizable chamber, wherein the clamp ring is affixed to an upper portion of the flexible member, wherein the clamp ring comprises a clamp labyrinth, wherein the top plate comprises a top plate labyrinth, wherein the clamp ring labyrinth meshes with the top plate labyrinth, and wherein the clamp ring labyrinth is fused to the top plate labyrinth.

The present invention further discloses an air spring comprising a piston, a top plate, an external snap ring, and a flexible member which is affixed to the piston and the top plate, wherein the piston, the top plate, and the flexible member define a pressurizable chamber, wherein the top plate is affixed to the external snap ring, and wherein the flexible member is affixed between the external snap ring and the top plate.

The present invention still further discloses an air spring comprising a piston, a top plate, an upper retaining ring, and a flexible member which is affixed to the piston and the top plate, wherein the piston, the top plate, and the flexible member define a pressurizable chamber, wherein the top plate includes a retaining ring channel, wherein the upper retaining ring includes a mounting wall which fits at least partially within the retaining ring channel, wherein the flexible member is nested in between the upper retaining ring and the top plate, and wherein the mounting wall is nested within the retaining ring channel.

In the various air spring designs of the present invention the top plate will typically be comprised of a polymeric material, such as a fiber filled composite composition. For instance, the polymeric material can be a fiber filled polyamide, such as a fiber filled nylon-6, nylon-11, nylon-12, nylon-6,6, nylon-4,6, nylon-6,10, and nylon-6,12. The fiber utilized in these composite materials is typically a glass fiber. In one preferred embodiment of the subject invention, the clamp ring is also comprised of a polymeric material which can be the same or different from the material from which is top plate is comprised.

DETAILED DESCRIPTION OF THE INVENTION

Figure 1:
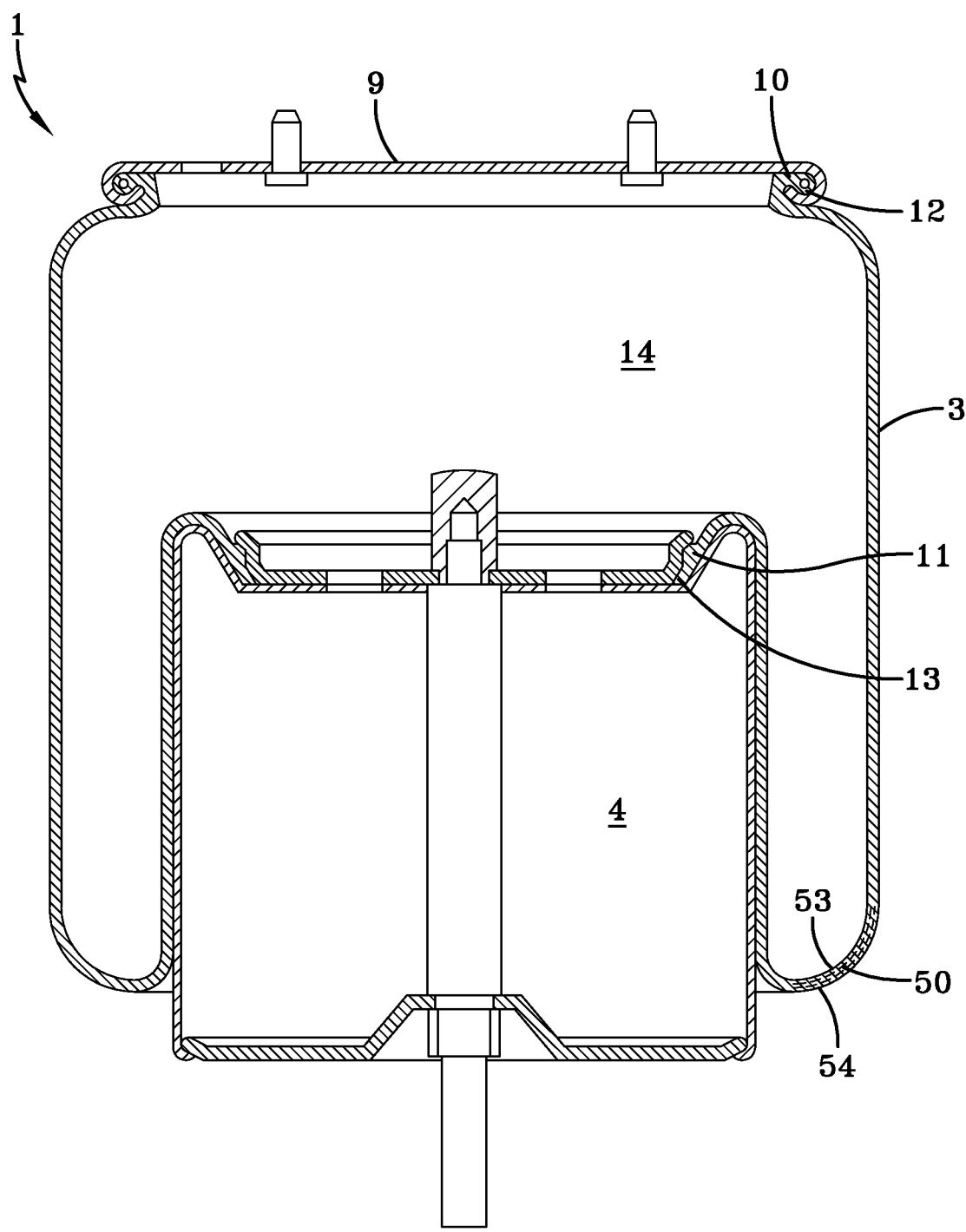
FIG. 1 is a cross-sectional view of a prior art air spring.

FIG. 1 shows a cross-section of a conventional state of the art air spring 1. The conventional state of the art air spring 1 includes a steel bead plate 9, a flexible member 3, and a piston 4. The flexible member includes an upper portion of the flexible member 10 which extends from the upper end of the flexible member 12 to no more than 25% along the length of the flexible member 3 from the upper end of the flexible member 12 to the lower end of the flexible member 13. The upper portion of the flexible member 10 is adapted to be affixed to the steel bead plate 9 to create an air tight seal. The flexible member 3 also includes a lower portion of the flexible member 11 which extends from the lower end of the flexible member 13 to no more than 25% along the length of the flexible member 3 from the lower end of the flexible member 13 to the upper end of the flexible member 12. The lower portion of the flexible member 11 is adapted to be affixed to the piston 4 to create an air tight seal. The lower portion of the flexible member 11 may be secured in any conventional manner, including, but not limited to, crimping the lower portion of the flexible member 11 to the piston 4 or to a conventional lower retainer or by securing a lower bead core by a lower retainer. An internal bumper may be provided for absorbing impact forces.

The steel bead plate 9, the flexible member 3, and the piston 4 define a pressurizable chamber 14. The pressurizable chamber 14 is generally filled with a gas, such as air or nitrogen, to a pressure greater than atmospheric pressure. The gas is usually air for economic reasons. However, the pressurizable chamber can optionally be filled with an inert gas, such as nitrogen to help protect the flexible member (a rubber component) from degradation caused by oxygen or ozone. The steel bead plate 9 is attached to either a fixed or movable component and the piston 4 is attached to a corresponding fixed or movable component so that loads tending to move the steel bead plate 9 and the piston 4 towards each other will be counteracted by the pressure within the pressurizable chamber 14.

Figure 2:
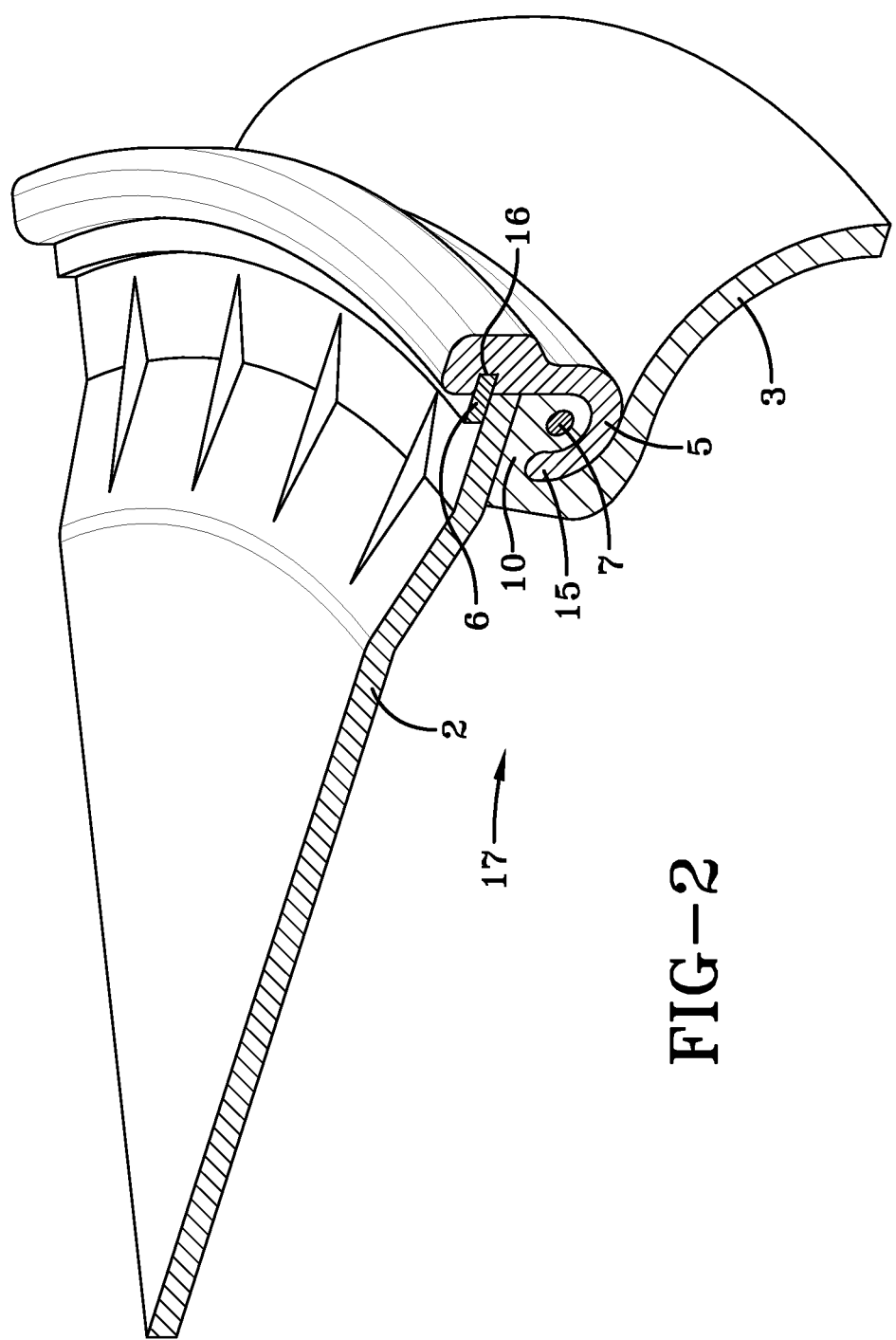
FIG. 2 is a perspective cross-sectional view of an air spring in accordance with this invention which utilizes a clamp ring and a snap ring.

FIG. 2 shows one embodiment of the present invention. This embodiment of the invention includes a top plate 2, a clamp ring 5, and a snap ring 6. This embodiment also includes the flexible member 3 and the piston 4 as was used in the conventional state of the art air spring 1. The clamp ring 5 is adapted to fit around the outer diameter of the top plate 2. The clamp ring includes a compression hook 15 which is adapted to compress the upper portion of the flexible member 10 against the top plate 2 when the three components are assembled together. The compression of the upper portion of the flexible member 10 against the top plate 2 creates an air tight seal.

The clamp ring 5 includes a snap ring groove 16 which is adapted to accommodate a snap ring 6. The snap ring 6 is adapted to fit partially within the snap ring groove 16. The top plate 2 and the upper portion of the flexible member 10 are affixed between the snap ring 6 and the compression hook 15. The upper portion of the flexible member 10 may optionally include a retention bead 7. The retention bead 7 improves the retention of the upper portion of the flexible member 10 in position between the top plate 2 and the compression hook 15. The retention bead 7 may consist of steel, polymeric fibers, or any other material which has a greater modulus of elasticity than the material used for the flexible member 3. The flexible member 3 is preferably comprised of at least 3 plies: an outer elastomeric ply 54, at least one reinforcing ply 50 formed of elastomeric embedded reinforcing cords, and an inner elastomeric ply 53.

Assembly of the internal snap ring air spring 17 of this embodiment of the invention is accomplished by positioning the upper portion of the flexible member 10 over the compression hook 15. The top plate 2 is then positioned over the upper portion of the flexible member 10. The top plate 2 can then be pressed toward the compression hook 15 to compress the upper portion of the flexible member 10 thereby exposing the snap ring groove 16. The snap ring 6 can then be positioned into the snap ring groove 16. The snap ring 6 retains the top plate 2 in a position that compresses the upper portion of the flexible member 10 between the top plate 2 and the compression hook 15.

Figure 3:
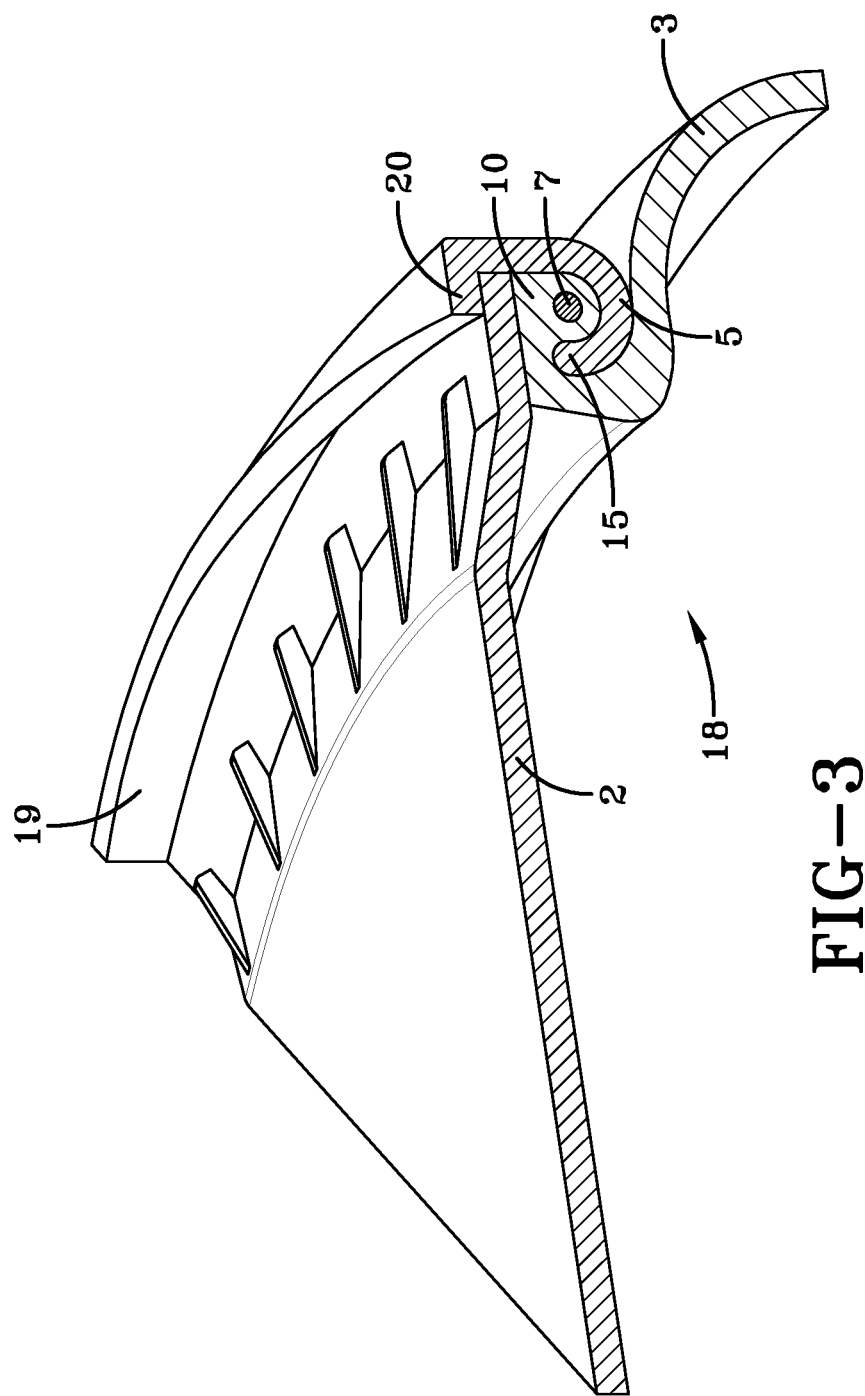
FIG. 3 is a perspective cross-sectional view of an air spring in accordance with this invention which utilizes a clamp ring which is deformed over the top of a top plate.

FIG. 3 shows another embodiment of the present invention. This embodiment of the invention includes a top plate 2 and a clamp ring 5. This embodiment also includes the flexible member 3 and the piston 4 as were used in the conventional state of the art air spring 1. The clamp ring 5 is adapted to fit around the outer diameter of the top plate 2. The clamp ring includes a compression hook 15 which is adapted to compress the upper portion of the flexible member 10 against the top plate 2 when the three components are assembled together. The compression of the upper portion of the flexible member 10 against the top plate 2 creates an air tight seal.

The clamp ring 5 includes a deformable rib 19. The deformable rib 19 is deformed during the assembly process to create the deformed rib 20. The top plate 2 and the upper portion of the flexible member 10 are affixed between the deformed rib 20 and the compression hook 15. The upper portion of the flexible member 10 may optionally include a retention bead 7. The retention bead 7 improves the retention of the upper portion of the flexible member 10 in position between the top plate 2 and the compression hook 15. The retention bead 7 may consist of steel, polymeric fibers, or any other material which has a greater modulus of elasticity than the material used for the flexible member 3.

Assembly of the deformed ring air spring 18 of this embodiment of the invention is accomplished by positioning the upper portion of the flexible member 10 over the compression hook 15. The top plate 2 is then positioned over the upper portion of the flexible member 10. The top plate 2 can then be pressed toward the compression hook 15 to compress the upper portion of the flexible member 10. The deformable rib 19 may then be deformed to create the deformed rib 20. The deformable rib 19 will generally be deformed through a mechanical process. The mechanical process may include rolling, compression, staking or any other means known in the art. The deformable rib 19 may also be heated to an elevated temperature to assist the mechanical process of deforming it. The heating of the deformable rib 19 may be from an external heat source, such as a gas flame or an electrical heater, or the heating can be done with a tool used in the mechanical process. In another embodiment of the invention the heating can be done by electrical induction. In any case, the deformed rib 20 retains the top plate 2 in a position that compresses the upper portion of the flexible member 10 between the top plate 2 and the compression hook 15.

Figure 4:
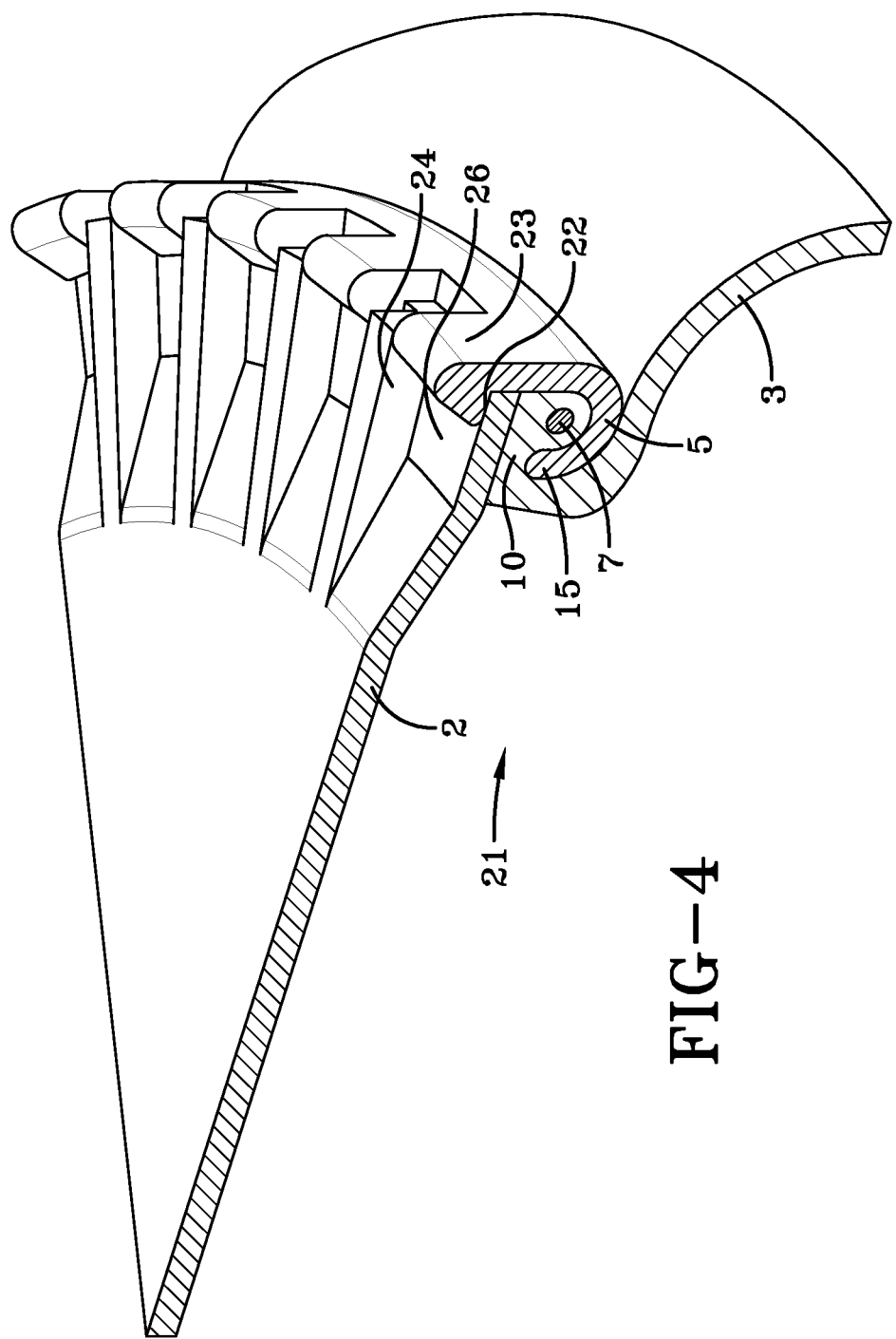
FIG. 4 is a perspective cross-sectional view of an air spring in accordance with this invention utilizing a clamp ring including a plurality of flexible fingers.
Figure 5:
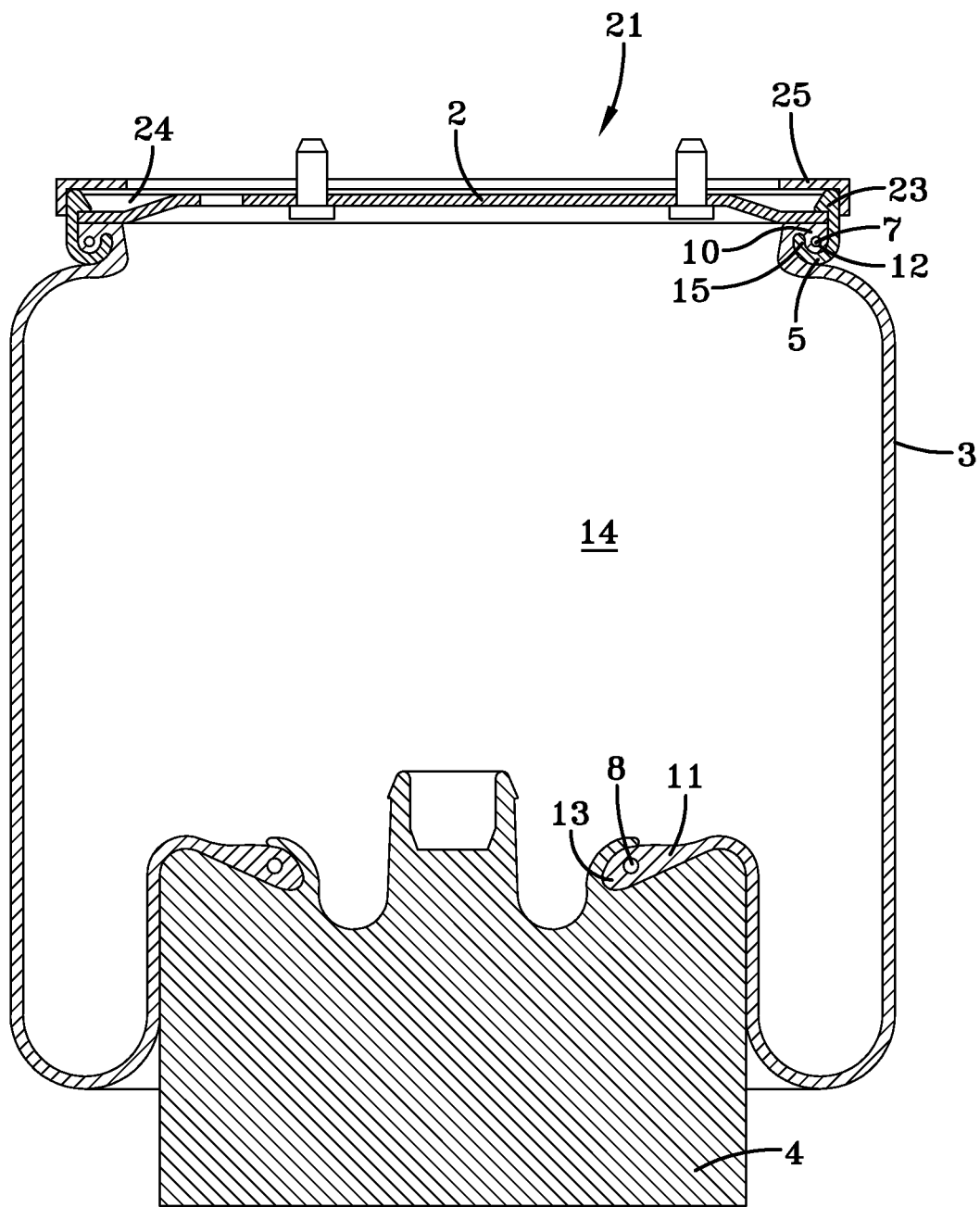
FIG. 5 is a cross-sectional view of an air spring in accordance with this invention utilizing a clamp ring including a plurality of flexible fingers and a locking ring.

FIGS. 4 and 5 show yet another embodiment of the present invention. This embodiment of the invention includes a top plate 2 and a clamp ring 5. This embodiment also includes the flexible member 3 and the piston 4 as were used in the conventional state of the art air spring 1. The clamp ring 5 is adapted to fit around the outer diameter of the top plate 2. The clamp ring includes a compression hook 15 which is adapted to compress the upper portion of the flexible member 10 against the top plate 2 when the three components are assembled together. The compression of the upper portion of the flexible member 10 against the top plate 2 creates an air tight seal.

Assembly of the external finger air spring 21 of this embodiment of the invention is accomplished by positioning the upper portion of the flexible member 10 over the compression hook 15. The top plate 2 is then positioned over the upper portion of the flexible member 10. The top plate 2 can then be pressed toward the compression hook 15 to compress the upper portion of the flexible member 10. The clamp ring has a plurality of flexible fingers 23 extending from the ring in a direction substantially parallel to the center axis of the clamp ring 5. The plurality of flexible fingers 23 expand around the outer circumference of the top plate 2 as the top plate is pressed past the plurality of flexible fingers 23. The plurality of flexible fingers 23 lock onto the top surface of the top plate 2 through locking flats 22. The plurality of flexible fingers 23 retain the top plate 2 in a position that compresses the upper portion of the flexible member 10 between the top plate 2 and the compression hook 15.

The top plate 2 and the upper portion of the flexible member 10 are affixed between the locking flats 22 and the compression hook 15. The upper portion of the flexible member 10 may optionally include a retention bead 7. The retention bead 7 improves the retention of the upper portion of the flexible member 10 in position between the top plate 2 and the compression hook 15. The retention bead 7 may consist of steel, polymeric fibers, or any other material which has a greater modulus of elasticity than the material used for the flexible member 3.

The top plate 2 will include a finger receiving ledge 57 and may optionally include a plurality of finger receiving ports 26. The plurality of finger receiving ports 26 are adapted to interact with the plurality of flexible fingers 23 on the clamp ring 5. The plurality of flexible fingers 23 lock onto the plurality of finger receiving ports through locking flats 22. The plurality of locking flats 22 are separated by a plurality of ribs 24. The plurality of ribs 24 provide not only additional structural support, but also provide an anti-rotation feature to prevent rotation of the clamp ring 5 relative to the top plate 2.

The external finger air spring 21 may also optionally include a locking ring 25 that is affixed around the plurality of flexible fingers 23. The locking ring 25 is positioned in such a manner that the locking ring 25 restrains movement of the plurality of flexible fingers 23 away from the outer circumference of the top plate 2. Because the locking ring 25 restrains displacement of the plurality of flexible fingers 23, the external finger air spring 21 can withstand much higher forces before the clamp ring 5 becomes unattached from the top plate 2 when utilizing the locking ring 25 than it can withstand without the locking ring 25.

Figure 6:
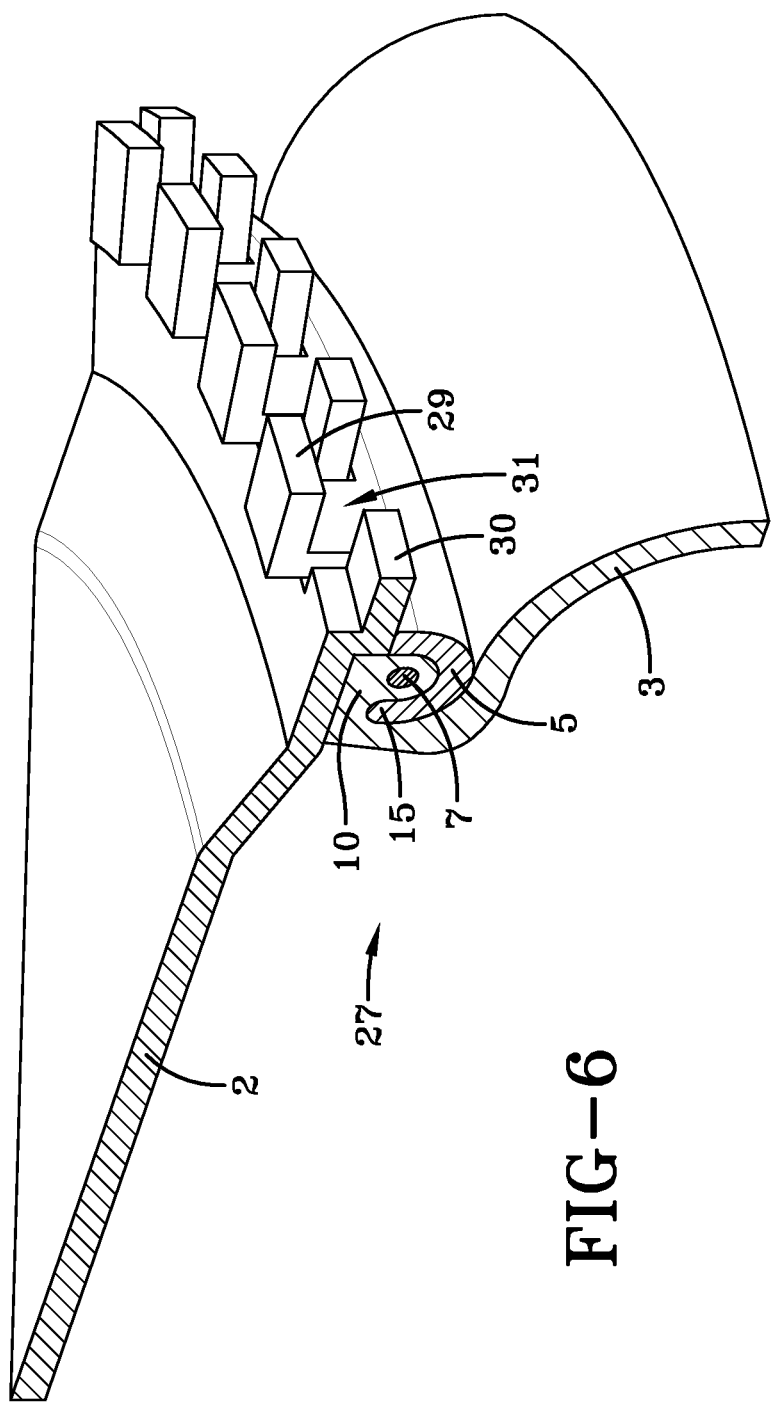
FIG. 6 is a perspective cross-sectional view of an air spring in accordance with this invention utilizing a clamp ring and top plate which include interleaving fingers forming a channel.
Figure 7:
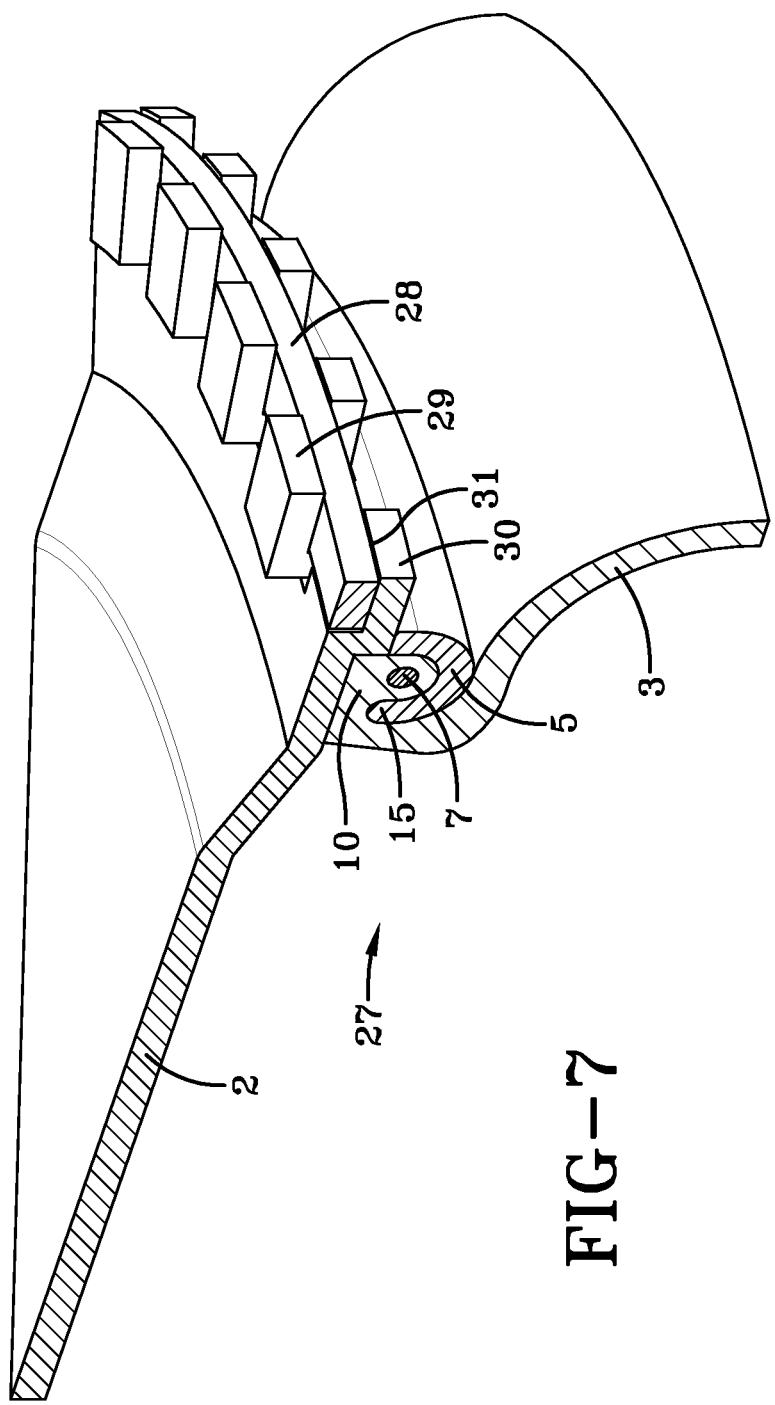
FIG. 7 is a perspective view of a snap ring of one embodiment of this invention inserted into a channel formed by interleaving fingers of a clamp ring and a top plate.

FIGS. 6 and 7 shows still another embodiment of the present invention. This embodiment of the invention includes a top plate 2, a clamp ring 5 and a retaining ring 28. This embodiment also includes the flexible member 3 and the piston 4 as were used in the conventional state of the art air spring 1. The clamp ring 5 includes a plurality of clamp ring fingers 29 which are adapted to interleave with top plate fingers 30 which extend from the outer circumference of the top plate 2. When the clamp ring fingers 29 interleave with the top plate fingers 30, they jointly form a channel 31 which is adapted to accommodate the retaining ring 28. The clamp ring includes a compression hook 15 which is adapted to compress the upper portion of the flexible member 10 against the top plate 2 when the three components are assembled together. The compression of the upper portion of the flexible member 10 against the top plate 2 creates an air tight seal.

The upper portion of the flexible member 10 is affixed between the top plate 2 and the compression hook 15. The upper portion of the flexible member 10 may optionally include a retention bead 7. The retention bead 7 improves the retention of the upper portion of the flexible member 10 in position between the top plate 2 and the compression hook 15. The retention bead 7 may consist of steel, polymeric fibers, or any other material which has a greater modulus of elasticity than the material used for the flexible member 3.

Assembly of the interleaved finger air spring 27 of this embodiment of the invention is accomplished by positioning the upper portion of the flexible member 10 over the compression hook 15. The top plate 2 is then positioned over the upper portion of the flexible member 10, angularly positioned so that the clamp ring fingers 29 and the top plate fingers 30 are aligned in such a manner that they can pass between one another. The top plate 2 can then be pressed toward the compression hook 15 to compress the upper portion of the flexible member 10. The top plate can be pressed to a point where the interleaving clamp ring fingers 29 and top plate fingers 30 form a channel 31 of sufficient width to accommodate the retaining ring 28. The retaining ring 28 can then be placed within the channel 31 which restrains movement of the clamp ring 5 relative to the top plate 2 in the direction parallel with the center axis of the clamp ring 5 and the top plate 2. The clamp ring fingers 29 and top plate fingers 30 also prevent relative angular rotation between the clamp ring 5 and the top plate 2.

Figure 8:
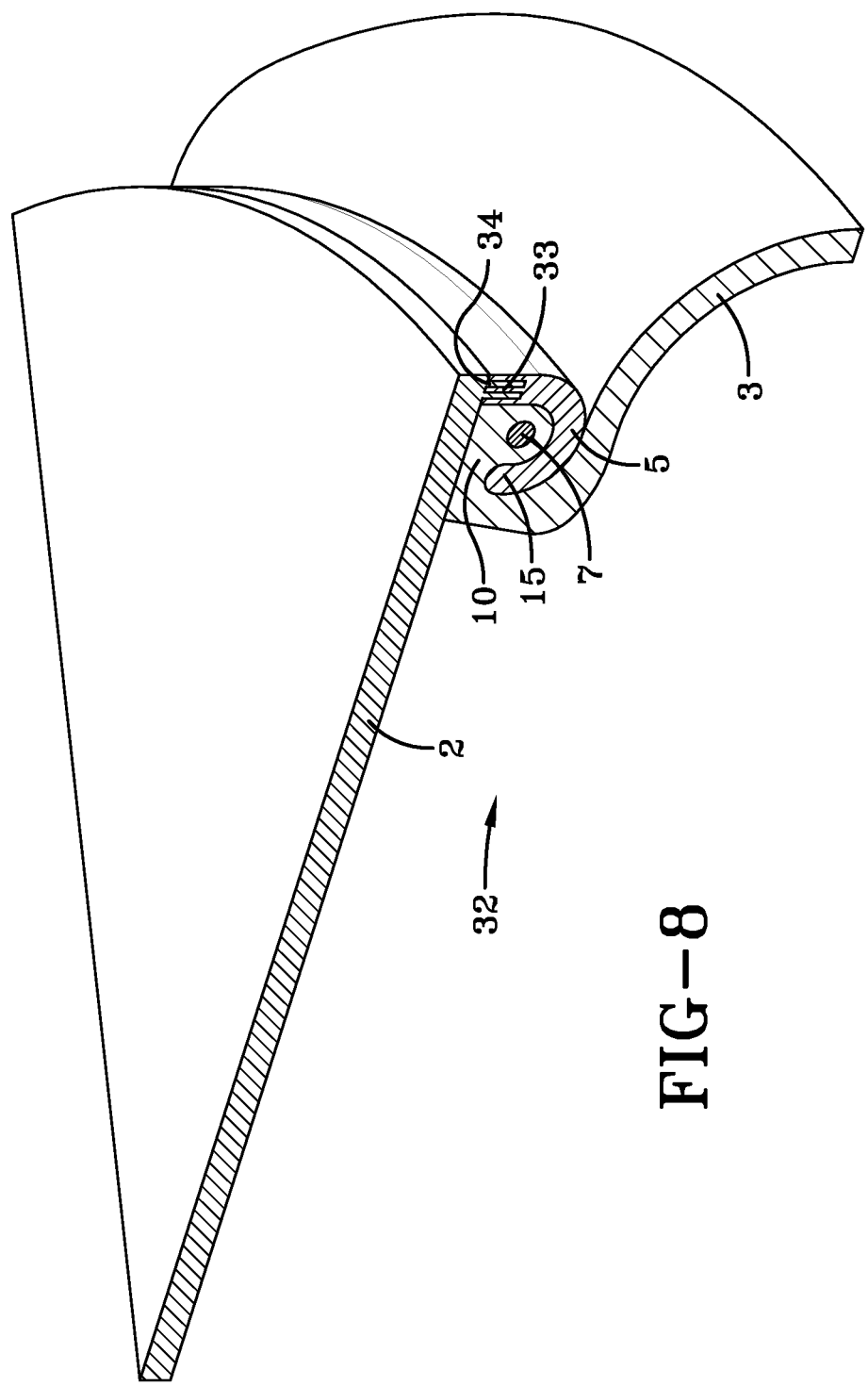
FIG. 8 is a perspective cross-sectional view of an air spring in accordance with this invention utilizing a clamp ring with a labyrinth.

FIG. 8 shows yet another embodiment of the present invention. This embodiment of the invention includes a top plate 2 and a clamp ring 5. This embodiment also includes the flexible member 3 and the piston 4 as were used in the conventional state of the art air spring 1. The clamp ring 5 includes a clamp ring labyrinth 33 which is adapted to intermesh with a top plate labyrinth 34 of the top plate 2. The clamp ring includes a compression hook 15 which is adapted to compress the upper portion of the flexible member 10 against the top plate 2 when the three components are assembled together. The compression of the upper portion of the flexible member 10 against the top plate 2 creates an air tight seal.

The upper portion of the flexible member 10 is affixed between the top plate 2 and the compression hook 15. The upper portion of the flexible member 10 may optionally include a retention bead 7. The retention bead 7 improves the retention of the upper portion of the flexible member 10 in position between the top plate 2 and the compression hook 15. The retention bead 7 may consist of steel, polymeric fibers, or any other material which has a greater modulus of elasticity than the material used for the flexible member 3.

Assembly of the labyrinth air spring 32 of this embodiment of the invention is accomplished by fusing the clamp ring labyrinth 33 to the top plate labyrinth 34, such as by use of an adhesive. The upper portion of the flexible member 10 is positioned over the compression hook 15. Alternatively the first two steps of the assembly process may be interchanged. The top plate 2 is then positioned over the upper portion of the flexible member 10 so that the top plate labyrinth 34 and the clamp ring labyrinth 33 are aligned. The top plate 2 can then be pressed toward the compression hook 15 to compress the upper portion of the flexible member 10. Employing an adhesive between the clamp ring labyrinth 33 and the top plate labyrinth 34 is one method of affixing the clamp ring 5 and the top plate 2 in a position that compresses the upper portion of the flexible member 10 between the top plate 2 and the compression hook 15.

Figure 9:
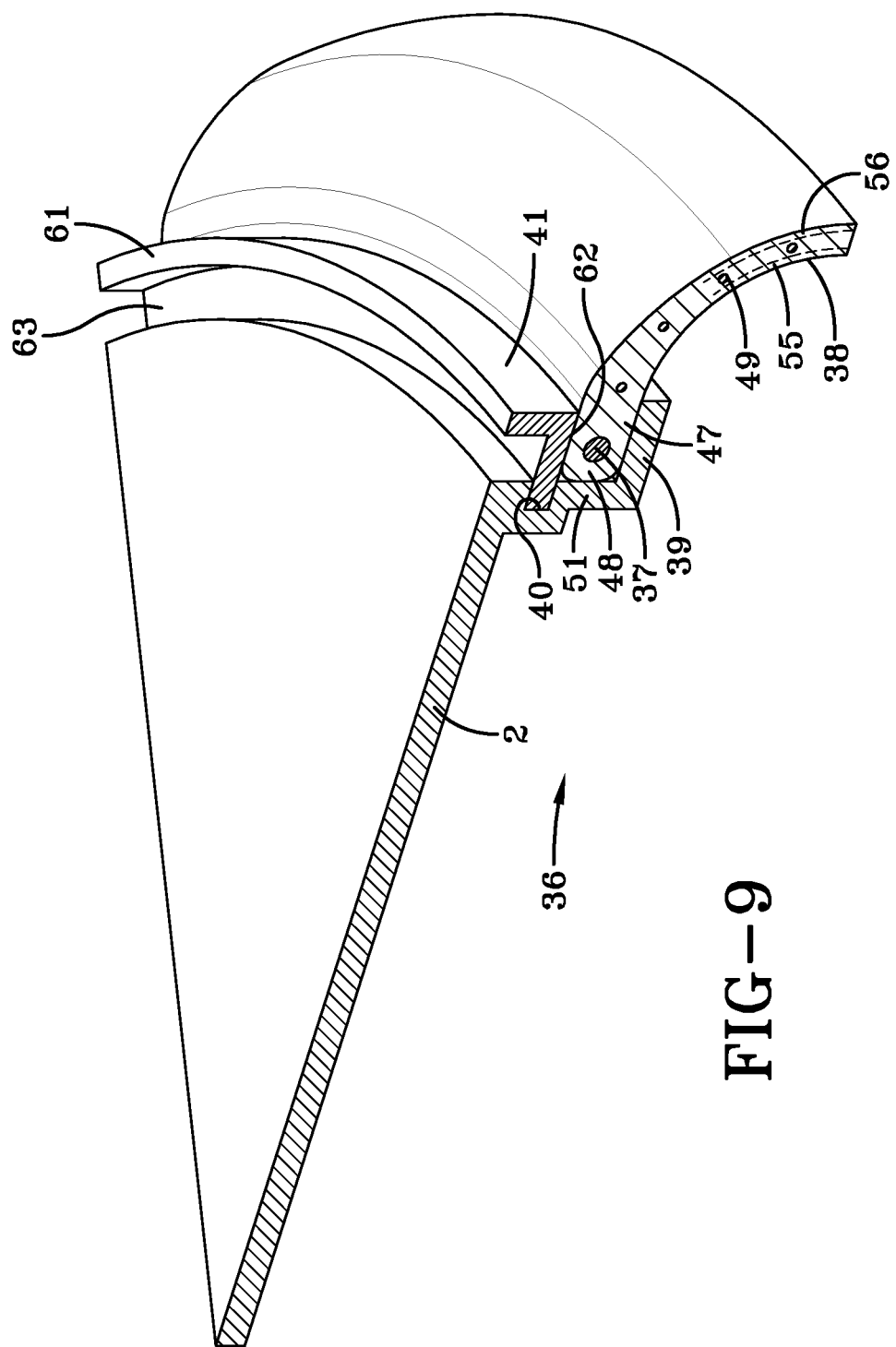
FIG. 9 is a perspective cross-sectional view of an air spring in accordance with this invention utilizing an external snap ring.

FIG. 9 shows still another embodiment of the present invention. This embodiment of the invention includes a top plate 2, an external snap ring 41 and an external flexible member 38 which is adapted to mate with an external mounting protrusion 39 of the top plate 2. This embodiment of the invention also includes the piston 4 as was used in the conventional state of the art air spring 1. An upper portion of the external flexible member 47 includes a relatively non-extensible bead 37. The upper portion of the external flexible member 47 extends from the upper end of the external flexible member 48 to no more than 25% along the length of the external flexible member 38 from the upper end of the external flexible member 48. The relatively non-extensible bead 37 prevents expansion of the upper end of the external flexible member 48 due to internal pressure. The relatively non-extensible bead 37 is at least one continuous winding of wire, preferably steel. The configuration of the relatively non-extensible bead 37 may vary as is conventionally known. The external flexible member 38 is preferably comprised of at least 3 plies: an outer elastomeric ply 56, at least one reinforcing ply 49 formed of elastomeric embedded reinforcing cords, and an inner elastomeric ply 55.

The external flexible member 38 is adapted to fit around the support wall 51 of the top plate 2. The compression of the support wall 51 against the upper portion of the upper end of the external flexible member 48 creates an air tight seal. The top plate 2 includes an external snap ring groove 40 which is adapted to accommodate the external snap ring 41. The external snap ring 41 is adapted to fit partially within the external snap ring groove 40.

Figure 10:
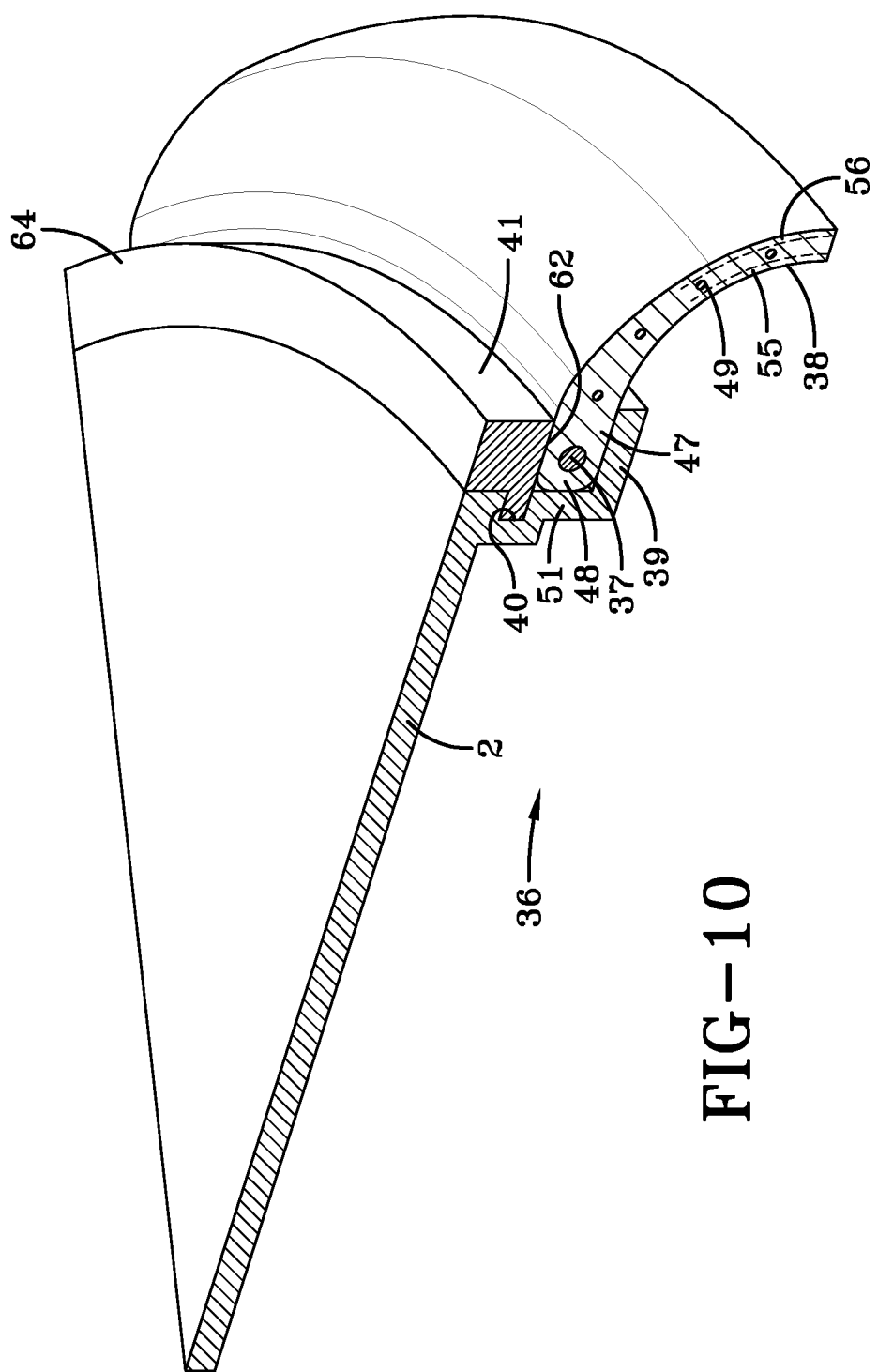
FIG. 10 is a perspective cross-sectional view of an air spring in accordance with this invention utilizing an external snap ring which mounts flush to the top plate of the air spring.

Assembly of the external snap ring air spring 36 of this embodiment of the invention is accomplished by positioning the upper portion of the flexible member 48 over the mounting protrusion 39. The external snap ring 41 is then placed into the external snap ring groove 40 to retain the external flexible member 38. In the embodiment of the invention illustrated in FIG. 9 the external snap ring 41 includes a reinforcing rib 61 to increase the rigidity and strength of the external snap ring 41 and its ability to reliable hold the external flexible member 38 in place. In this embodiment of the invention the reinforcing rib 61 extends upwardly from the base of the external snap ring 62 to form a trough 63 which is defined by the top plate 2, the base of the external snap ring 62, and the reinforcing rib 61. In still another embodiment of the invention as illustrated in FIG. 10 the external snap ring 62 has a reinforcing rib 64 which mounts flush to the top plate 2 without forming a trough.

Figure 11:
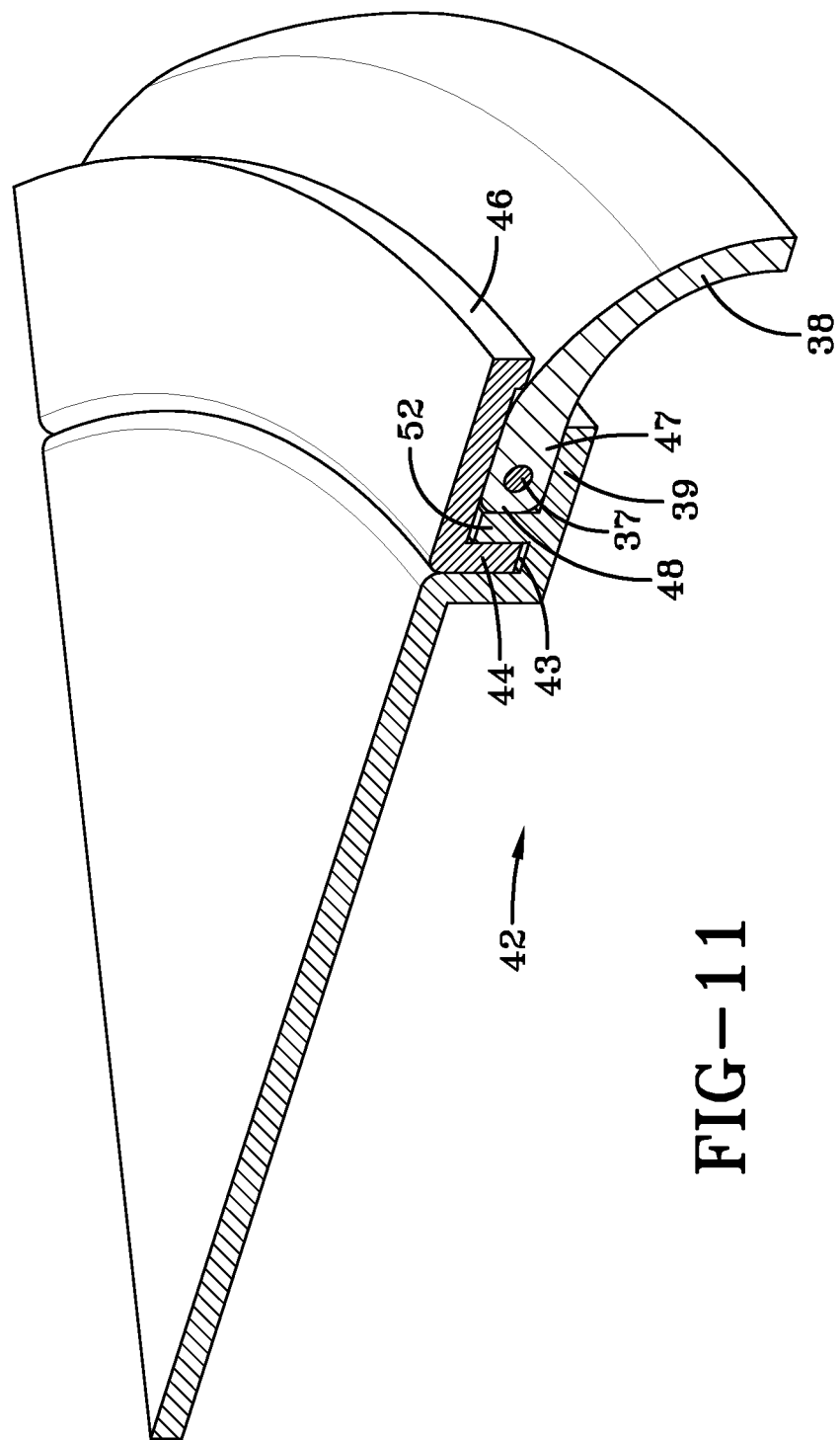
FIG. 11 is a perspective cross-sectional view of an air spring in accordance with this invention utilizing an upper retaining ring.

FIG. 11 shows yet another embodiment of the present invention. This embodiment of the invention includes a top plate 2, an upper retaining ring 46 and the external flexible member 38 which is adapted to mate with an external mounting protrusion 39 of the top plate 2. This embodiment of the invention also includes the piston 4 as was used in the conventional state of the art air spring 1. An upper portion of the external flexible member 47 includes a relatively non-extensible bead 37. The upper portion of the external flexible member 47 extends from the upper end of the external flexible member 48 to no more than 25% along the length of the external flexible member 38 from the upper end of the external flexible member 48. The relatively non-extensible bead 37 prevents expansion of the upper end of the external flexible member 48 due to internal pressure. The relatively non-extensible bead 37 is at least one continuous winding of wire, preferably steel. The configuration of the relatively non-extensible bead 37 may vary as is conventionally known.

The external flexible member 38 is adapted to fit around the outer external wall 52 of the top plate 2. The compression of the mounting protrusion 39 against the upper portion of the external flexible member 47 creates an air tight seal. The top plate 2 includes an upper retaining ring groove 43 which is adapted to accommodate the upper retaining ring 46. The upper retaining ring 41 is adapted to fit partially within the upper retaining ring groove 43.

Assembly of the upper retaining ring air spring 42 of this embodiment of the invention is accomplished by positioning the upper portion of the flexible member 10 over the mounting protrusion 39. An adhesive may optionally be placed around either the inner ring 44 of the upper retaining ring 46, in the upper retaining ring groove 43 or both. The upper retaining ring 46 is then placed into the upper retaining ring groove 43 to retain the external flexible member 38.

The structural components of the present invention (top plate 2, the clamp ring 5, the snap ring 6, the locking ring 25, the retaining ring 28, the external snap ring 41, and the upper retaining ring 46) may consist of metallic or polymeric materials. The structural components of the present invention may consist of ferrous or non-ferrous metals including steel, stainless steel, aluminum, magnesium, zinc and cast iron. The structural components of the present invention which consist of metallic materials may be coated for increased corrosion resistance. Because all of the embodiments of the present invention, except for the clamp ring 5 of the deformed ring air spring 18, are formed in their final structure before assembly of the components; the structural components of the present invention do not have the issue of damage to the anti-corrosive coating. The anti-corrosive coating may include zinc coating, oxide coating, paint, powder coating or any other coating known in the art.

The structural components of the present invention will preferably be injection molded from a resilient polymeric material, such as a thermoplastic and particularly fiber filled thermoplastics. For instance, the polymeric material utilized can be a polycarbonate, a polyester, a polyolefin, or a polyamide. Some representative examples of polyolefins that can be used include fiber filled low density polyethylene, fiber filled linear low density polyethylene, fiber filled high density polyethylene, and fiber filled polypropylene. Some representative examples of polyesters that can be used include polyethylene terephthalate, polyethylene terephthalate copolymers containing up to about 5 weight percent isophthalic acid, and polyethylene napthalate. The resilient material will more preferably be a fiber filled polyamide. The fiber will preferably be glass fibers and will typically be loaded at a level of 15 to 50 weight percent. The fiber will preferably be loaded at a level of 25 to 40 weight percent. The fiber will more preferably be loaded at a level of 30 to 35 weight percent. Some representative examples of polyamides that can be utilized include nylon-6, nylon-11, nylon-12, nylon-6,6, nylon-4,6, nylon-6,10, and nylon-6,12. Such nylon materials will preferably be filled with a glass fiber. Highly preferred materials include nylon-6,6 which is filled with long glass fibers (commercially available as CELSTRAN), and short fiber reinforced thermoplastic (commercially available as ZYTEL). In any case, the tensile strength of the material should be within the range of 1965 to 3165 kg/cm$^2$ (28,000 to 45,000 psi). It will preferably also have a flex strength in the range of 2810 to 4220 kg/cm$^2$ (40,000 to 60,000 psi) and notched izod strength of 0.117-0.703 N-m/mm (2.0 to 12.0 ft-lb/in).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fully intended scope of the invention as defined by the following appended claims.

What is claimed is:

1. An air spring comprising:
  a piston;
  a top plate;
  a retaining ring; and
  a flexible member affixed to the piston and the top plate,
    wherein the piston, the top plate and the flexible member define a pressurizable chamber,
    wherein the retaining ring affixes an upper portion of the flexible member to the top plate and holds the flexible member in air-tight contact with the top plate,
    wherein the flexible member has a side external to the pressurizable chamber and a side internal to the pressurizable chamber,
    wherein the top plate is affixed to the side of the flexible member that is internal to the pressurizable chamber,
    wherein the upper portion of the flexible member that is affixed to the top plate is closer to the piston than the retaining ring is to the piston,
    wherein the top plate forms, by itself, a retaining ring groove,
    wherein the top plate is monolithic, and wherein the retaining ring is adapted to fit at least partially within the retaining ring groove.

2. The air spring of claim 1, wherein the retaining ring is an upper retaining ring,
wherein the upper retaining ring includes an inner ring which fits at least partially within the retaining ring groove.

3. The air spring of claim 2, wherein the flexible member is nested in between the upper retaining ring and a mounting protrusion of the top plate, and wherein the inner ring is nested within the retaining ring groove.

4. The air spring of claim 3, wherein the inner ring is affixed in the retaining ring groove.

5. The air spring as specified in claim 4, wherein the inner ring is affixed in the retaining ring groove with an adhesive.

6. The air spring of claim 1, wherein the upper portion of the flexible member includes a bead to prevent expansion of an upper end of the flexible member.

7. The air spring of claim 6, wherein the bead is a continuous winding of wire.

8. An air spring comprising:
a piston;
a top plate;
a snap ring; and
a flexible member affixed to the piston and the top plate, wherein the flexible member comprises an upper portion, wherein the upper portion originates at an upper end of the flexible member and terminates at a length that extends no more than 25% of a total length of the flexible member,
wherein the piston, the top plate and the flexible member define a pressurizable chamber,
wherein the snap ring affixes the upper end of the flexible member and the upper portion of the flexible member to the top plate, and wherein the snap ring holds the flexible member in air-tight contact with the top plate,
wherein the top plate is affixed to the snap ring,
wherein the flexible member is affixed between the snap ring and the top plate,
wherein the top plate includes a snap ring groove and a mounting protrusion,
wherein the flexible member is fixed between the snap ring and the mounting protrusion,
wherein the upper end of the flexible member that is affixed to the top plate is closer to the piston than the snap ring is to the piston,
wherein the top plate forms, by itself, the snap ring groove, and
wherein the snap ring is adapted to fit at least partially within the snap ring groove,
wherein the snap ring includes a reinforcing rib adapted to extend upwardly from a base of the snap ring to form a trough, wherein the trough is defined by the top plate, the base of the snap ring, and the reinforcing rib.

9. The air spring of claim 8, wherein the flexible member is comprised of at least three plies, and wherein the at least three plies include at least one of each of: an outer elastomeric ply, a reinforcing ply, and an inner elastomeric ply.

10. The air spring of claim 8, wherein the upper portion of the flexible member includes a bead to prevent expansion of the upper end of the flexible member.

11. The air spring of claim 10, wherein the bead is a continuous winding of wire.

12. An air spring comprising:
a piston;
a top plate;
a retaining ring; and
a flexible member affixed to the piston and the top plate, wherein the flexible member comprises an upper portion, where the upper portion originates at an upper end of the flexible member and terminates at a length that extends no more than 25% of a total length of the flexible member,
wherein the piston, the top plate and the flexible member define a pressurizable chamber,
wherein the retaining ring affixes the upper end of the flexible member and the upper portion of the flexible member to the top plate, and wherein the retaining ring holds the flexible member in air-tight contact with the top plate,
wherein the top plate is affixed to the retaining ring,
wherein the flexible member is affixed between the retaining ring and the top plate,
wherein the upper end of the flexible member that is affixed to the top plate is closer to the piston than the retaining ring is to the piston,
wherein the top plate forms, by itself, a retaining ring groove,
wherein the top plate is monolithic, and
wherein the retaining ring is adapted to fit at least partially within the retaining ring groove.

13. The air spring of claim 12, wherein the flexible member is comprised of at least three plies, and wherein the at least three plies include at least one of each of: an outer elastomeric ply, a reinforcing ply, and an inner elastomeric ply.

14. The air spring of claim 12, wherein the upper portion of the flexible member includes a bead to prevent expansion of the upper end of the flexible member.

15. The air spring of claim 14, wherein the bead is a continuous winding of wire.

* * * * *